April 15, 1930.  M. GILMORE  1,755,112

TOOL CARRIER

Filed Oct. 12, 1928

Maurice Gilmore,
INVENTOR

BY Victor J. Evans
ATTORNEY

WITNESS:

Patented Apr. 15, 1930

1,755,112

UNITED STATES PATENT OFFICE

MAURICE GILMORE, OF ABBOTSFORD, BRITISH COLUMBIA, CANADA

TOOL CARRIER

Application filed October 12, 1928. Serial No. 312,146.

My present invention has reference to a tool and accessory carrier for automobiles, and my primary object is to removably arrange upon the bumper brackets at the front of the automobile a carrier in the nature of a box or cabinet, that is normally closed by a flanged top or cover and which is designed to contain therein spark plugs, wrenches and all other articles that may be required for use in connection with or for repairing parts of the automobile engine, and whereby the same will be conveniently located and accessible when needed.

A further object is the provision of a tool and accessory carrier for this purpose which can be easily and quickly attached to the bumper brackets between the front space and forward of the radiator of an automobile so that the same will not interfere with the cranking of the machine should the same be found necessary and wherein the device is strongly supported and may be readily attached and removed in a minimum amount of time.

To the attainment of the foregoing and other objects which will present themselves, the improvement will be better understood from a reading of the following description when taken in connection with the accompanying drawings and the points of novelty will be pointed out with particularity in the appended claim.

Figure 1:
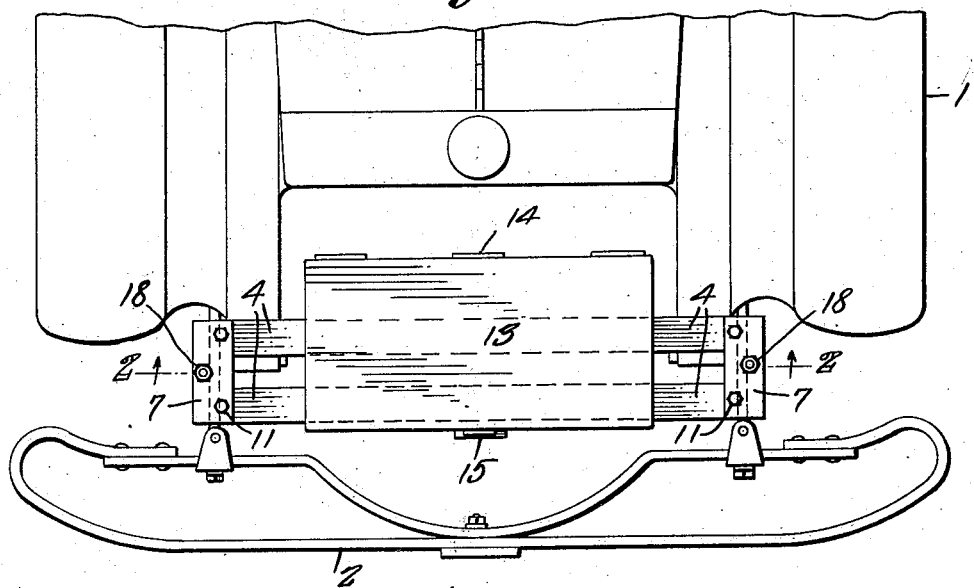
Figure 1 is a top plan view of a sufficient portion of an automobile to illustrate the application of the improvement.
Figure 2:
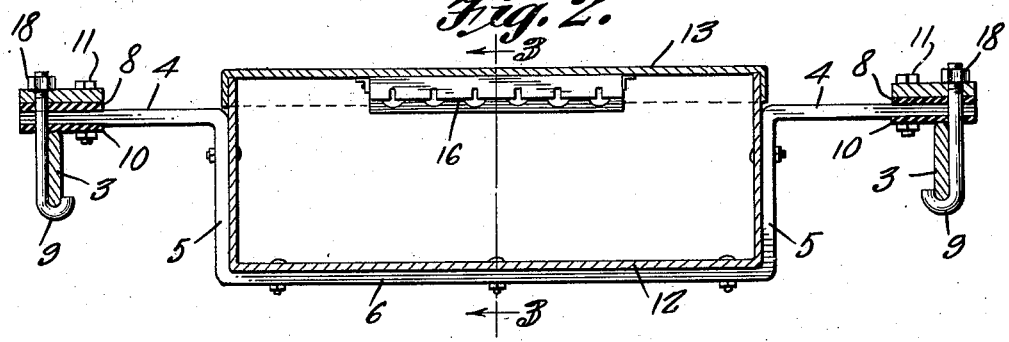
Figure 2 is a sectional view on the line 2—2 of Figure 1.
Figure 3:
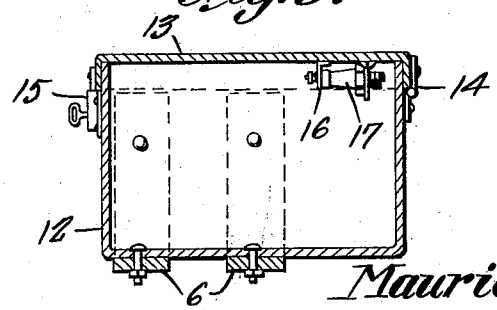
Figure 3 is a transverse sectional view approximately on the line 3—3 of Figure 2.

As my improvement is removably attached to the bumper brackets at the front of an automobile, only a portion of the machine sufficient to illustrate the application of the improvement is disclosed by Figure 1 of the drawings. The automobile 1 is provided with the usual front bumper 2 and the securing bars or brackets for the bumper are indicated by the numerals 3. The supporting plates for the box or cabinet rest directly upon the brackets 3.

In carrying out my invention I make use of two flat strong metal plates 4, respectively. Each of these plates at points equidistant from the center is bent rightangularly, as at 5, and the connecting element for these angle portions are indicated by the numeral 6. Thus it will be noted that the center of each of the plates 4 is substantially U-shaped. The spaced plates 4 have their ends connected by short plates 7 and the under face of these short plates have arranged thereon compressible sheets 8. There is passed through each of the plates 7 the threaded shank of a hook bolt 9. The hook portion of each of the bolts 9 engages with the lower edge of the bumper bracket 3 and preferably there is arranged over the upper edge of the said bracket a second sheet of compressible material 10 which is held on the under face of the plates 4 by means 11 that secure the short plates 7 to the box or cabinet supporting plates 4.

Received in the central and substantially U-shaped portions of the supporting plates and secured thereto by bolts or rivets there is the box or cabinet 12 of the improvement. The box or cabinet has an open top which, however, is closed by a flange door 13 whose rear end is hinged, as at 14, to the box or cabinet 12. The door or closure 13 is normally sustained in closed position by locking means 15 arranged between the outer flange and the outer face of the box or cabinet 12. By reference to the drawings it will be seen that the under face of the cover or closure 13 is provided with spaced elements 16 that afford a rack for spark plugs 17. Such tools and accessories as are required to repair or tighten the parts of the automobile engine are arranged in the box or cabinet 12. The rear of the box is positioned a suitable distance away from the radiator of the machine, such distance being sufficient to permit of the cranking of the engine. The device may be easily and quickly attached to the machine by simply fastening or unscrewing the nuts 18 that are screwed on the bolts 9 and the simplicity and advantages of the improvement will, it is thought, be understood without further detailed description.

Having described the invention, I claim:

A tool carrier for the purpose set forth designed to rest on and to be removably secured to the bumper brackets at the front of an automobile, comprising spaced plates, a short plate secured to each of the spaced plates at one end thereof, a second short plate secured to each of the spaced plates at the other end thereof, hook bolts adjustably secured to the short plates and having their hook portions engaging with the bumper brackets, said spaced plates each having a downwardly directed central substantially U-shaped portion and a box or cabinet received in and fixed to said U-shaped portions.

In testimony whereof I affix my signature.

MAURICE GILMORE.